US006081964A

United States Patent [19]

Mori

[11] Patent Number: 6,081,964

[45] Date of Patent: Jul. 4, 2000

[54] GROMMET WITH A GROOVE FOR CHANNELIZING WATER DRIPS

[75] Inventor: Keisuke Mori, Yokkaichi, Japan

[73] Assignee: Sumitomo Wiring Systems, Ltd., Japan

[21] Appl. No.: 09/085,557

[22] Filed: May 27, 1998

[30] Foreign Application Priority Data

Jun. 4, 1997 [JP] Japan .................................... 9-146296

[51] Int. Cl.[7] ................................ F16L 5/00; F16L 5/02; H01B 17/58; H02G 3/18

[52] U.S. Cl. .............................. 16/2.2; 16/2.3; 174/65 G; 174/153 G

[58] Field of Search ..................... 16/2.2, 2.3; 174/65 G, 174/153 G, 153 R, 151

[56] References Cited

U.S. PATENT DOCUMENTS

| | | | |
|---|---|---|---|
| 4,010,986 | 3/1977 | Otto . | |
| 5,138,117 | 8/1992 | Oikawa et al. | 16/2.2 X |
| 5,453,579 | 9/1995 | Cohea | 16/2.2 X |

FOREIGN PATENT DOCUMENTS

| | | | |
|---|---|---|---|
| 0 603 741 A1 | 6/1994 | European Pat. Off. . | |
| 2 730 785 | 8/1996 | France . | |
| 1 806 569 | 2/1960 | Germany . | |
| 1 166 567 | 3/1964 | Germany | 174/153 G |
| 25 56 506 | 6/1977 | Germany | 174/153 G |
| 42 13 727 | 4/1993 | Germany . | |
| 57-171164 | 10/1982 | Japan | 16/2.2 X |
| 6-80255 | 11/1994 | Japan . | |
| 2 286 978 | 9/1995 | United Kingdom . | |

*Primary Examiner*—Anthony Knight
*Assistant Examiner*—Robert L. Pilaud
*Attorney, Agent, or Firm*—Anthony J. Casella; Gerald E. Hespos; Michael J. Porco

[57] ABSTRACT

A grommet is provided to prevent water, having entered through a fine clearance between a locking recess of the grommet and the edge of a through hole formed in a panel, from entering a first or passenger compartment. A jaw portion 3 or groove 30 is formed on or in the conical outer surface of a tapered tube portion 2 between an outer panel 6 and an inner panel 7. The jaw portion 3 or groove 30 blocks the water having entered through a clearance between a through hole 6*a* formed in the outer panel 6 and a locking recess 2*a* and trying to run toward a narrow tube portion 1 and causes it to fall down. Accordingly, the entered water falls down between the outer panel 6 and the inner panel 7 without entering the first or passenger compartment inside the inner panel 7.

2 Claims, 3 Drawing Sheets

GROMMET WITH A GROOVE FOR CHANNELIZING WATER DRIPS

BACKGROUND OF THE INVENTION

1. Field of the Invention

The present invention relates to a grommet to be mountable on a wiring harness to be arranged through a panel of an automotive vehicle and is particularly designed to improve the water preventing property thereof.

2. Description of the Prior Art

A prior art grommet that is mountable on a wiring harness W/H to be arranged between a passenger compartment and a door of an automotive vehicle is shown in FIGS. 4–6.

As shown in FIG. 5, a grommet 100 includes an integral assembly having a narrow tube portion 40. A tapered tube portion 41 is continuous with one end of the narrow tube portion 40, and has a diameter of which increases so as to be conically configured. A locking recess 41*a* is formed in the outer surface of a larger side of the tapered tube portion 41. A corrugated tube portion 42 is continuous with the tapered tube portion 41, and a tapered tube portion 43 is continuous with the corrugated tube portion 42. A locking recess 43*a* is formed in the outer surface of the tapered tube portion 43. The tube portions 40, 41 and the locking recess 41*a* are to be arranged at a passenger compartment side, whereas the tapered tube portions 43 and the locking recess 43*a* are to be arranged at a door side.

The wiring harness W/H is passed through a hollow portion of the grommet 100. The locking recess 41*a* is lockingly engaged with a through hole 44*a* formed in an outer panel 44 and the narrow tube portion 40 is passed through a through hole 45*a* formed in an inner panel 45. The locking recess 43*a* is lockingly engaged with a through hole 46*a* formed in a door panel 46. In this way, the wiring harness W/H can be arranged between the passenger compartment and the door.

The entrance of water through the through holes typically is prevented by the grommet 100. However, there are some cases where the entrance of water cannot be securely prevented by the grommet 100. In other words, water may enter through a fine clearance between the locking recesses 41*a*, 43*a* of the grommet 100 and the through holes 44*a*, 46*a*. In this case, the water 47 having entered the door can be discharged outside through water discharge holes formed in the bottom of the interior of the door D shown in FIG. 4. However, as shown in FIG. 6, water 48 may enter the passenger compartment inside the inner panel 45 along the surfaces of the tapered tube portion 41 and the narrow tube portion 40 of the grommet 100 and the surface of the wiring harness W/H. Thus, there is a possibility that such water 48 may cause a short circuit of electrodes connected with a connector 49 at the leading end of the wiring harness W/H, thereby adversely affecting an electric circuit.

In view of the above problems, an object of the present invention is to provide a grommet which can prevent water from entering a passenger compartment through a fine clearance between locking recesses of the grommet and the edges of through holes.

SUMMARY OF THE INVENTION

According to the invention, there is provided a grommet comprising an integral or unitary assembly of a narrow tube portion, a tapered tube portion which is continuous with one end of the narrow tube portion and the diameter of which increases, and a locking recess provided in or on the outer surface of a larger side of the tapered tube portion. The grommet is mounted or mountable in a through hole formed in a first panel of a vehicle body with a wiring harness passed through the hollow portion thereof. A water drip causing means is provided on the tapered outer surface of the tapered tube portion. A portion of the grommet from the drip causing means to the narrow tube portion is passed or is passable through a through hole formed in a second panel of the vehicle body so as to cause water having entered through a grommet mounting portion of the first panel to fall down between the first and second panels by the water drip causing means.

As is clear from the above description, according to the inventive grommet, the water running over the surface of the tapered tube portion between the first and second panels of the vehicle body is blocked by the water drip causing means formed on or in the tapered tube portion, and is caused to fall down from the water drip causing means. Accordingly, the entrance of water toward the passenger compartment any farther than the water drip causing means can be prevented securely, thereby eliminating a likelihood of the water adversely affecting an electric circuit.

According to a preferred embodiment of the invention, the water drip causing means comprises a jaw or collar or flange portion projecting from the tapered outer surface of the tapered tube portion.

Preferably, there is provided a grommet comprising an integral assembly of a narrow tube portion and a tapered tube portion. The tapered tube portion is continuous with one end of the narrow tube portion and the diameter of the tapered portion increases so as to be conically configured. A locking recess is provided in the outer surface of a larger side of the tapered tube portion. The grommet is mounted in a through hole formed in a first panel of a vehicle body with a wiring harness passed through the hollow portion thereof. A jaw portion projects from the conical outer surface of the tapered tube portion. A portion of the grommet from the jaw portion to the narrow tube portion is passed through a through hole formed in a second panel of the vehicle body. Thus water that enters through a grommet mounting portion of the first panel is caused by the jaw portion to fall down between the first and second panels.

With the above construction, water entering through the grommet mounting portion of the first panel and trying to run over the surface from the tapered tube portion to the narrow tube portion is blocked by the jaw portion that projects from the conical outer surface of the tapered tube portion and is caused to fall down after running down the jaw portion. Accordingly, water entering through the grommet mounting portion of the first panel falls down between the first panel and the second panel through which the narrow tube portion is inserted without running toward the narrow tube portion.

Preferably, the projecting length of the jaw portion is smaller than a length between the base end position of the jaw portion and the locking recess. With such setting, the jaw portion will not be caught between the through hole of the first panel and the locking recess of the tapered tube portion when the grommet is mounted on the first panel. Thus, there is no likelihood that the jaw portion will be caught between the through hole of the first panel of the vehicle body and the locking recess of the tapered tube portion when the grommet is mounted on the first panel. As a result, the grommet can be more easily mounted.

Further preferably, the jaw portion is arranged substantially vertically (or at an angle different from 0° or 180°) to the longitudinal direction of the tapered tube portion. Alternatively the jaw portion may be arranged or arrangeable at an angle different from 0° or 180° to the horizontal, and preferably substantially vertically, when the grommet is mounted on the first and second panels. Accordingly, a very effective water entrance or stopping function of the jaw portion can be provided.

According to a further preferred embodiment, the water drip causing means comprises a groove formed in the tapered, and preferably conical outer surface of the tapered tube portion.

Preferably, there is provided a grommet comprising an integral assembly of a narrow tube portion and a tapered tube portion. The tapered tube portion is continuous with one end of the narrow tube portion, and the diameter of the tapered tube portion increases so as to be conically configured. A locking recess is provided in the outer surface of a larger side of the tapered tube portion. The grommet is mounted in a through hole formed in a first panel of a vehicle body with a wiring harness passed through the hollow portion thereof. A groove is formed in the conical outer surface of the tapered tube portion and a portion of the grommet from the groove to the narrow tube portion is passed through a through hole formed in a second panel of the vehicle body. Thus water entering through a grommet mounting portion of the first panel is caused by the groove to fall down between the first and second panels.

Even when the groove is provided instead of or additionally to the jaw portion as above, any entering water will fall down from the groove after being temporarily deposited therein.

Preferably, the grommet is mounted or mountable on a wiring harness. The wiring harness is passed through through holes formed in an inner panel (i.e. the second panel) and an outer panel (i.e. the first panel) and through a through hole formed in a door panel. The water drip causing means, preferably the jaw portion and/or the groove is located between the inner panel and the outer panel. With the above grommet, water entering through the grommet mounting portion of the outer panel falls down between the inner and outer panels without entering the inside of the inner panel, i.e. of the passenger compartment.

The grommet may preferably further comprise a corrugated tube portion substantially continuously provided at the leading end of the tapered tube portion, a second tapered tube portion substantially continuously provided at the leading end of the corrugated tube portion, and a locking recess formed in the outer surface of the second tapered tube so as to be engaged with the through hole of the door panel. The grommet as above can be mounted on a wiring harness to be arranged between a passenger compartment and a door of an automotive vehicle.

The diameter of the tapered tube portion may increase so as to be substantially conically configured.

Most preferably, the drip causing means, preferably the jaw portion is circumferentially provided on the tapered tube portion.

These and other objects, features and advantages of the present invention will become more apparent upon a reading of the following detailed description and accompanying drawings.

BRIEF DESCRIPTION OF THE DRAWINGS

FIGS. 1A and 1B show a first embodiment of the invention, wherein FIG. 1A is a schematic diagram of a grommet and FIG. 1B is an enlarged view of an essential portion of a jaw portion.

FIGS. 3A and 3B show a second embodiment of the invention, wherein FIG. 3A is a schematic diagram of a grommet and FIG. 3B is an enlarged view of an essential portion of a groove.

DETAILED DESCRIPTION OF THE PREFERRED EMBODIMENTS

Figure 1A:
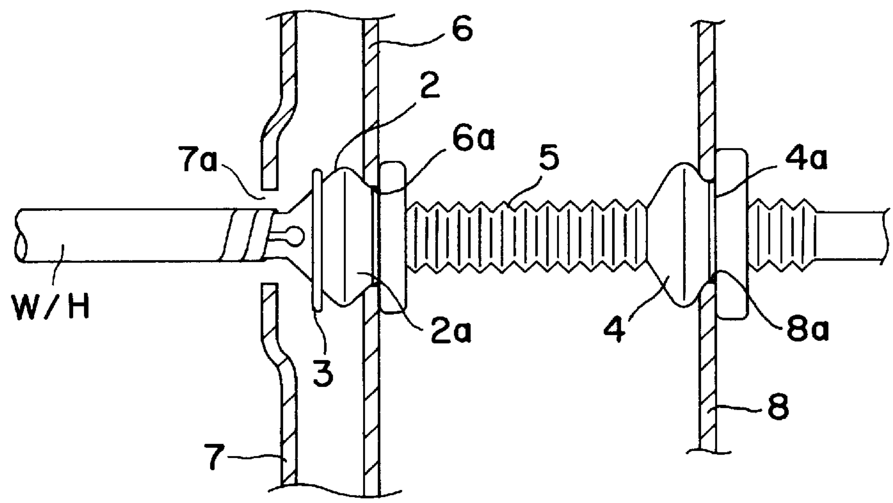
Figure 1B:
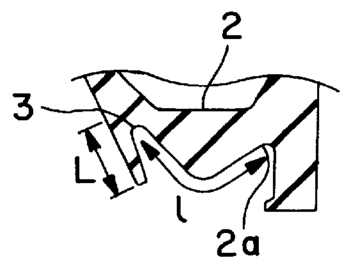

A grommet according to a first embodiment is shown in FIG. 1 and is mountable on a wiring harness to be arranged between two parts, preferably a passenger compartment and a door of an automotive vehicle.

At a first side, preferably a passenger compartment side, the grommet has an integral assembly of a narrow tube portion 1, a tapered tube portion 2 and a locking recess **2*a*. The tapered tube portion 2 is continuous with one end of the narrow tube portion 1 and the diameter increases so as preferably to be configured substantially conically. The locking recess 2*a* is formed in the outer surface of a larger side of the tapered tube portion 2. A jaw portion 3 projects from the conical outer surface of the tapered tube portion 2 while being inclined toward the locking recess 2*a*. A projecting length L of the jaw portion 3 (i.e. a length L in radial direction of the projection of the jaw portion 3 as measured from the base end at the tapered surface of the tapered tube portion 2) is shorter or smaller than a length 1 between the base end position of the jaw portion 3 and the locking recess 2*a*, preferably as measured along the outer side of the tapered tube portion 2**.

At a second side, preferably a door side, the grommet has an integral or unitary assembly of a tapered tube portion 4 and a locking recess **4*a* formed in the outer surface of the tapered tube portion 4**.

An expandable corrugated tube portion 5 is substantially continuous with the tapered tube portion 2 at the first or passenger compartment side and the tapered tube portion 4 at the second or door side.

A wiring harness W/H is inserted into a hollow portion of the grommet from the narrow tube portion 1 at the first or passenger compartment side to the tapered tube portion 4 at the second or door side, and is fixed by taping or comparable fixing means at the leading end of the narrow tube portion 1.

The locking recess **2*a* of the first or passenger compartment side is lockingly engaged with a through hole 6*a* formed in an outer panel 6 which serves as a first panel of a vehicle body. The narrow tube portion 1 is inserted into a through hole 7*a* formed in an inner panel 7 which serves as a second panel of the vehicle body. As a result, the jaw portion 3 substantially projects between the outer panel 6 and the inner panel 7 while being inclined toward the outer panel 6, in particular upon insertion into the through hole 6*a*. When the locking recess 2*a* is engaged lockingly with the through hole 6*a* of the outer panel 6, the narrow tube portion 1 is pulled toward the inside of the outer panel 6. If the projecting length L of the jaw portion 3 is too long, the jaw portion 3 may be caught between the edge of the through hole 6***a* and the locking recess 2*a*. However, since the projecting length L is smaller than the length 1 between the base end position of the jaw portion 3 and the locking recess 2*a*, the above undesirable event can be prevented and the grommet can be mounted easily.

Further, the locking recess 4*a* of the second or door side is lockingly engaged with a through hole 8*a* formed in a door panel 8.

The wiring harness W/H is arranged between the first part or passenger compartment and the second part or door by mounting the grommet having the wiring harness W/H passed through on the panels 6, 7, 8 as described above.

Figure 2:
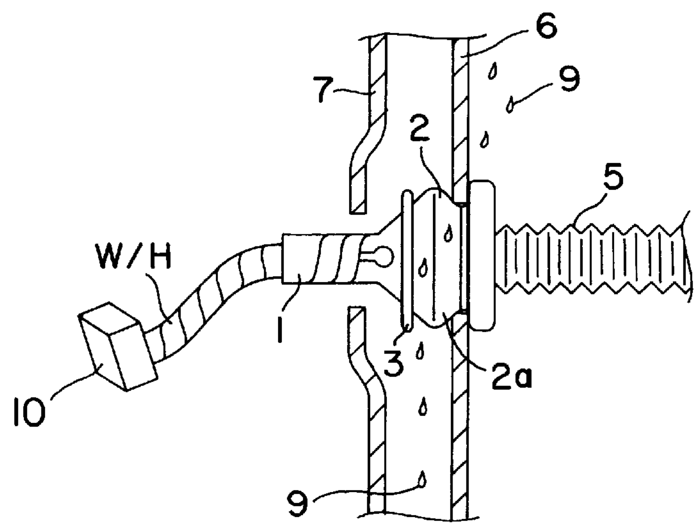
FIG. 2 is a schematic cross section of the grommet according to the first embodiment mounted through outer and inner panels.

Water 9 may splash on the tapered tube portion 2 outside the outer panel 6 and enter the inside of the outer panel 6 through a fine clearance between the edge of the through hole 6*a* in the outer panel 6 and the locking recess 2*a* of the tapered tube portion 2 as shown in FIG. 2. The entered water 9 tries to run over the surface of the tapered tube portion 2 toward the narrow tube portion 1. However, this water is blocked by the jaw portion 3, since the jaw portion 3 preferably is arranged at an angle different from 0° or 180° from the horizontal, and preferably substantially normal thereto (i.e. substantially vertically arranged) in its mounted state. Thus the water 9 runs down to the leading end of the jaw portion 3 and falls or drips down between the outer panel 6 and the inner panel 7.

Water 9 that falls down between the outer panel 6 and the inner panel 7 does not run as far as the wiring harness W/H at the leading end of the narrow tube portion 1. Hence the entrance of water to the inside of the inner panel 7, i.e. to the first or passenger compartment, is prevented. Thus, there is no likelihood that the entered water will cause a short circuit in a connector 10 that could adversely affect an electric circuit.

Water having entered the inside of the second part or door through the clearance between the locking recess 4*a* of the tapered tube portion 4 of the second or door side and the through hole 8*a* formed in the door panel 8 is discharged outside through water discharge holes (not shown) provided at the bottom of the interior of the second part or door as in the prior art.

Figure 3A:
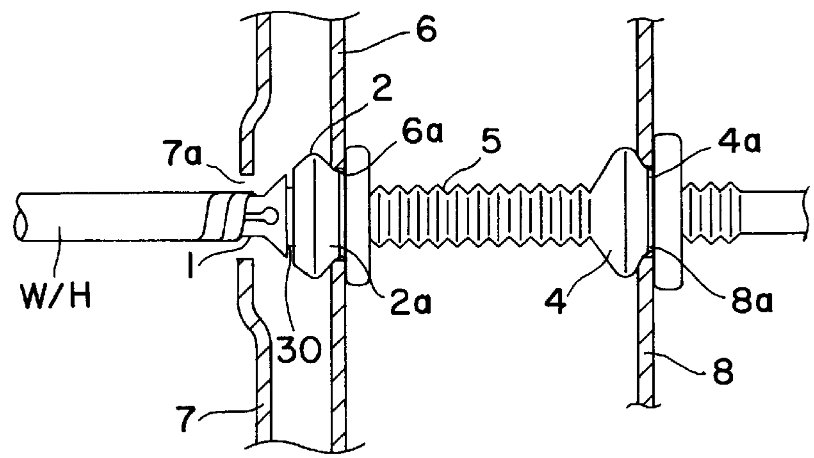
Figure 3B:
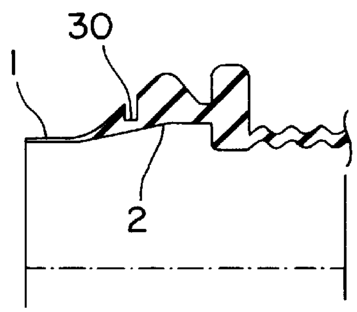
Figure 4:
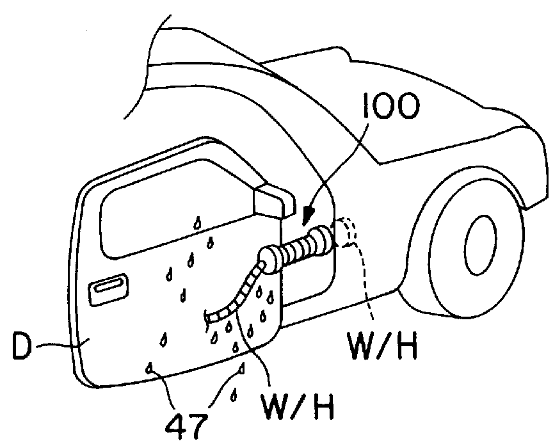
FIG. 4 is a schematic perspective view of a prior art grommet mounted on an automotive vehicle.
Figure 5:
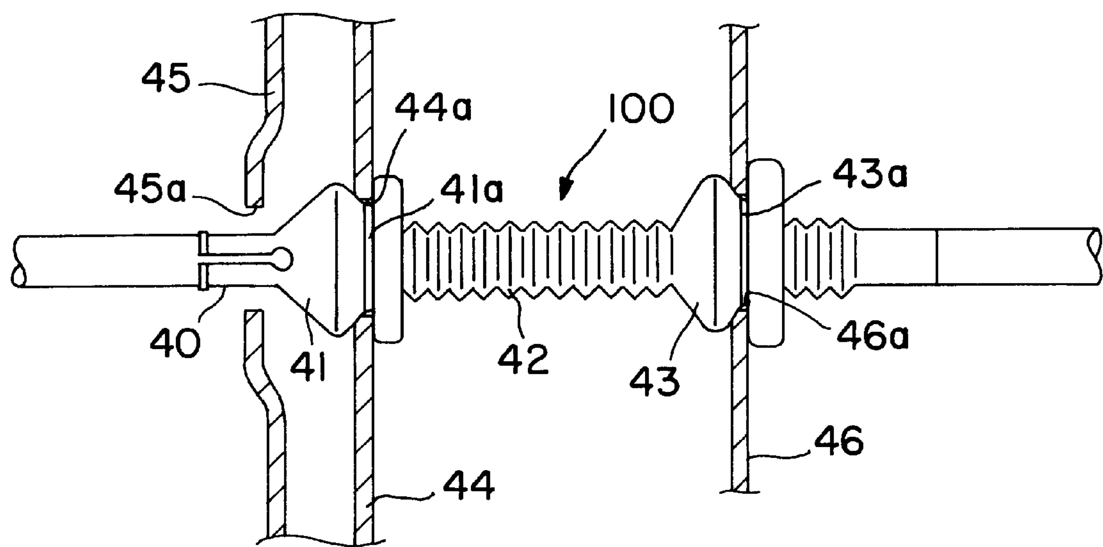
FIG. 5 is a schematic diagram of the prior art grommet.
Figure 6:
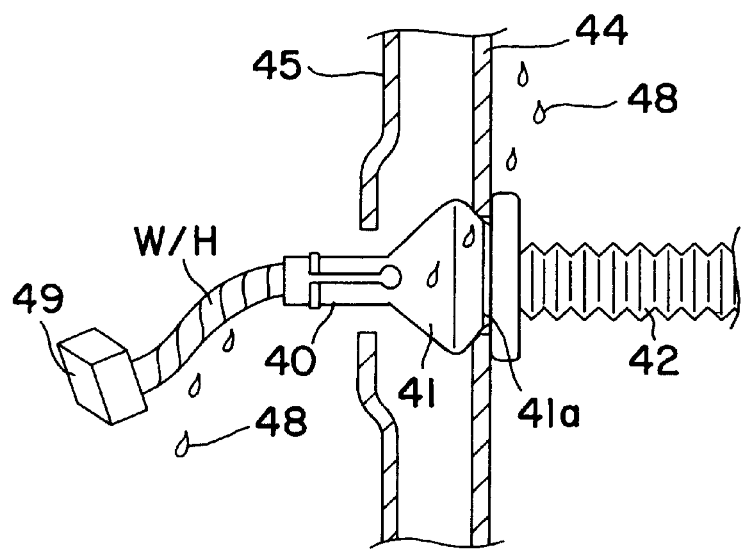
FIG. 6 is a schematic section of the prior art grommet mounted through outer and inner panels.

FIGS. 3A and 3B show a second embodiment, in which a groove 30 is formed instead of the jaw portion 3. Since the other construction is similar or identical, no description is given thereon by identifying it by the similar or same reference numerals.

Even in the case that the groove 30 is formed as in the second embodiment, water having entered through the outer panel 6 is deposited in the groove 30 after running over the outer surface of the tapered tube portion 2 and falls down from the groove 30. Therefore, the entrance of water through the inner panel 7 can be prevented.

Although the wiring harness is arranged between the first or passenger compartment and the second part or door in the foregoing embodiments, the inventive grommet may also be applied to a wiring harness to be arranged in an other portion of an automotive vehicle so as to cause the entered water to fall down by the jaw portion or groove 30 provided at the tapered tube portion 2 of the grommet, thereby securely preventing the entrance of water to the inside of the first or passenger compartment.

As is clear from the above description, according to the inventive grommet, the water running over the surface of the tapered tube portion between the first and second panels of the vehicle body is blocked by the jaw portion and/or groove (acting as water drip causing means) formed on or in the tapered tube portion, and is caused to fall down from the jaw portion or groove. Accordingly, the entrance of water toward the first or passenger compartment any farther than the jaw portion or groove can be prevented securely, thereby eliminating a likelihood that the enter water adversely affects an electric circuit.

What is claimed is:

1. A grommet for use with an automotive vehicle, said vehicle having an inner panel and an outer panel in spaced relationship to one another, each said panel having an aperture formed therein with a specified diameter, said grommet extending through said apertures and comprising: a narrow tube portion cross-sectionally dimensioned for passing through the aperture in the inner panel, a first conically generated portion projecting outwardly from the narrow tube portion and disposed between the inner and outer panels such that the first conically generated portion defines an end with a small diameter adjacent the narrow tube portion and an end with a large diameter spaced from the narrow tube portion, an annular drip-causing groove extending inwardly on the grommet adjacent the large diameter end of the first conically generated portion, a second conically generated portion having an end with a small diameter adjacent the annular drip-causing groove and an end with a large diameter spaced from the annular drip-causing groove, the small diameter of the second conically generated portion being no smaller than the large diameter of the first conically generated portion, an annular locking recess formed around the grommet adjacent the large diameter end of the second conically generated portion, the annular locking recess being dimensioned for lockingly engaging the grommet to the outer panel at the aperture therein, the annular drip-causing groove causing any water passing between the grommet and the aperture in the outer panel to form drips that fall below the grommet between the inner and outer panels.

2. A grommet according to claim 1, further comprising a corrugated tube portion provided at the large diameter end of the second conically generated portion and extending away from the narrow tube portion, a tapered tube portion provided at an end of the corrugated tube portion opposite the second conically generated portion, and a locking recess formed in an outer surface of the tapered tube portion so as to be engageable with a through hole of a door panel of the vehicle.

* * * * *